INVENTOR.
BORGE R. REIMER

July 18, 1967

B. R. REIMER 3,331,259

LOCKING MEANS FOR A SHIFTING MECHANISM

Filed Aug. 3, 1965

INVENTOR.
BORGE R. REIMER

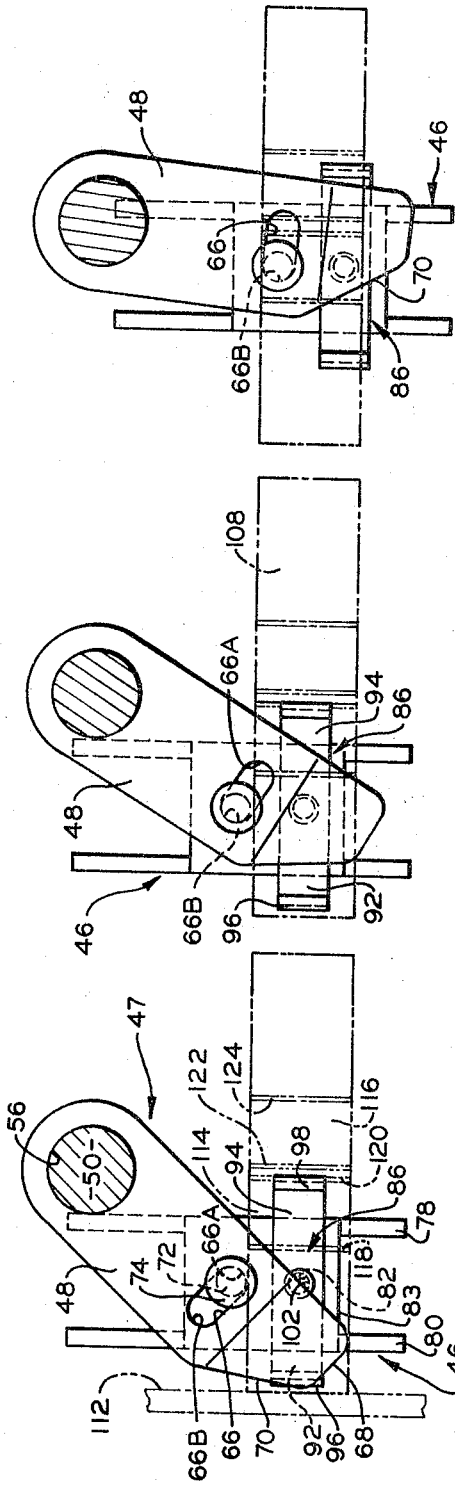

July 18, 1967 B. R. REIMER 3,331,259
LOCKING MEANS FOR A SHIFTING MECHANISM
Filed Aug. 3, 1965 5 Sheets-Sheet 5

INVENTOR.
BORGE R. REIMER
BY Walter E. Pavlick
Harold D. Stall
ATTORNEYS

United States Patent Office 3,331,259
Patented July 18, 1967

3,331,259
LOCKING MEANS FOR A SHIFTING MECHANISM
Borge R. Reimer, St. Catharines, Ontario, Canada, assignor to Hayes-Dana Limited, Thorold, Ontario, Canada, a corporation of Canada
Filed Aug. 3, 1965, Ser. No. 477,040
8 Claims. (Cl. 74—475)

This invention relates in general to locking means and more particularly to an improved locking means for shifting mechanisms.

Shifting mechanisms having locking means are generally adapted in combination with a variety of devices, such as a transmission, where it is desirable to shift a shiftable member, such as a gear, to various operative positions. The primary purpose for incorporating a locking means in a shifting mechanism is to prevent involuntary movement of a shiftable member. Where the shiftable member is a gear which has been moved into engagement with another gear, the involuntary movement thereof toward disengagement is commonly referred to in the art as gear hopping and may come about as a result of vibrations and bumps present during normal operating conditions or as a result of torque being transmitted between the engaged members.

Some of the more advanced prior art locking means incorporated in shifting mechanisms are arranged so that the locking means may be disengaged by the same actuating movement which causes the shifting of the shiftable member; the disengaging of the locking means preferably occurring before the movement of the shiftable member so that the operator can apply the unlocking load and shifting load separately. To accomplish such separate unlocking and shifting, it is a common practice to have a movable element in the shifting mechanism arranged so that upon initial operation of the shifting mechanism, the movable element is operable to disengage the locking means while further operation of the shifting mechanism will effect shifting of the shiftable member; the arrangement being such that gear hopping loads will not induce unlocking movement of said one element so that the locking means is effective to inhibit gear hopping.

The most common form of such locking means utilizes a spring loaded poppet, and the prior are devices have been directed to producing a compact structure which requires a reduced amount of physical effort on the part of the operator to disengage the locking means and effect a shift of the shiftable member. Although some of the prior are locking devices have been successful in that they are compact and reduce the effort utilized by the operator, they require a relatively high number of machined parts having close tolerances and are relatively expensive to manufacture.

The locking means of this invention when utilized in combination with a shift mechanism enables the combined mechanism to separately perform the function of shifting and indexing the shiftable member, as do the prior are devices, and also results, in a novel, compact and durable structure of fewer and less sophisticated components that require little effort to operate, while being relatively inexpensive and simple to manufacture and assemble.

It is an object, therefore, of this invention to provide a locking means in combination with a shifting mechanism which is economical to manufacture and which may be adapted to various shifting requirements.

It is another object of this invention to provide a locking means in combination with a gear shift mechanism which is compact in design and has a reduced number of parts.

It is another object of this invention to provide a locking means for a shifting mechanism which locking means is connectable with the housing of the shifting mechanism to form a locking connection therewith and operative to be acted upon by said shifting mechanism and to be initially overcome prior to the effecting of a shifting operation by said shifting mechanism.

It is another object of this invention to provide locking means in combination with a gear shift mechanism wherein the unlocking movement of one of the elements of the shifting mechanism and the shifting movement thereof occurs consecutively so that the over-all force to complete the shift is reduced.

It is another object to provide a locking means which utilizes a biasing force to effect the locking action.

Further objects and advantages will become apparent from the following description and claims, and may be understood by reference to the accompanying drawings which, by way of illustration, show the locking means of this invention combined with a gear shift mechanism.

In the accompanying drawings.

Figure 10:
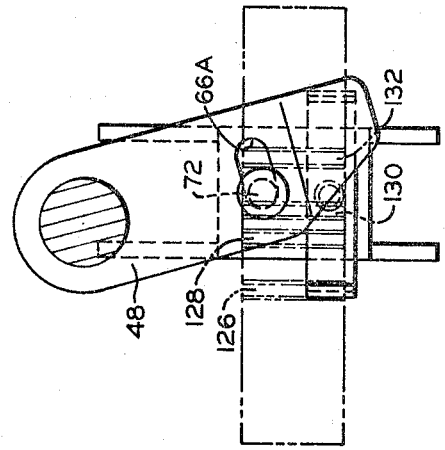
Figure 12:
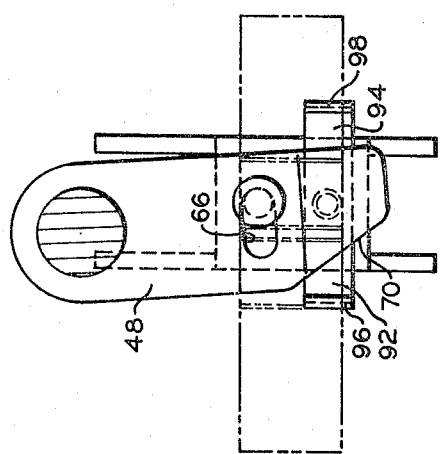
Figure 14:
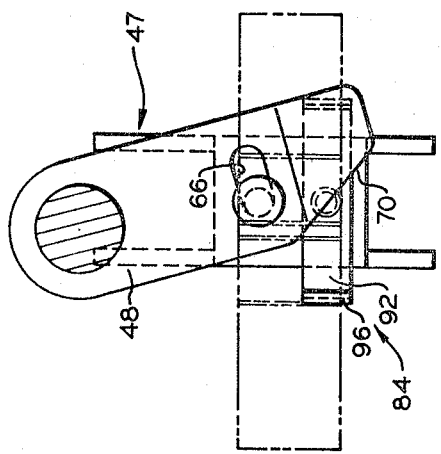
Figure 11:
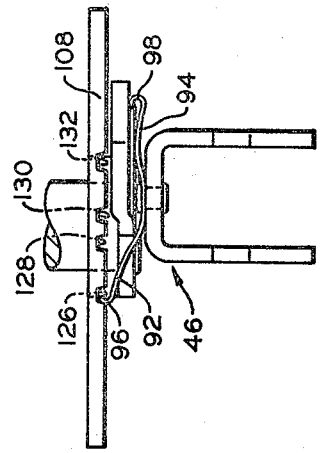
Figure 13:
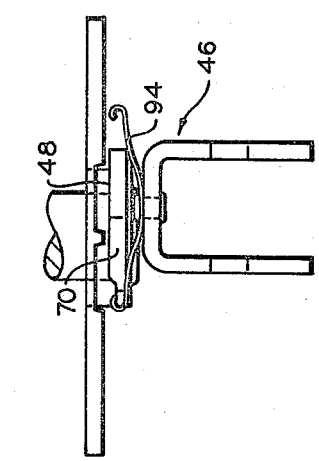
Figure 15:
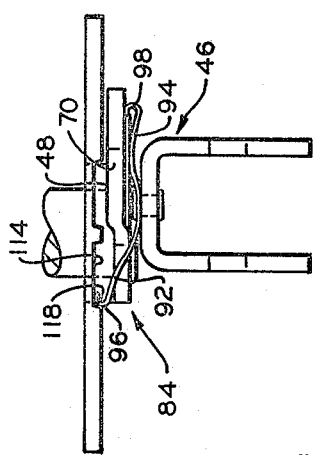

FIGS. 4, 6, 8, 10 and 12 are plan views of the locking means and shifting mechanism in various positions; and FIGS. 5, 7, 9, 11 and 13 are side views of the locking means and shifting mechanism in the positions shown in FIGS. 4, 6, 8, 10 and 12 respectively. FIGS. 4 and 5 show the shifting mechanism locked in a first position by the locking means, FIGS. 6 and 7 show the shifting mechanism after the locking means has been unlocked but prior to shifting of the shiftable member. FIGS. 8 and 9 show the shifting mechanism in an intermediate position, FIGS. 10 and 11 show the shifting mechanism locked in a second position by the locking means and FIGS. 12 and 13 show the shifting mechanism unlocked in the second position;

FIG. 14 is a plan view of another embodiment of this invention with the shifting mechanism locked in the second position; and FIG. 15 is a side view of the mechanism shown in FIG. 14.

In a preferred embodiment of this invention, the locking means is combined with a shifting mechanism of a power take-off unit having a shiftable member or gear therein, which shiftable member is adapted to be moved to alternate selected positions. The shifting mechanism includes an actuating lever mounted in the housing of the unit and adapted to be moved to alternate selected positions, thereby moving a shifting element which operatively engages and moves the shiftable member to its corresponding position. One portion of the locking means is carried by the shifting element and comprises resilient means having operative ends. One of the operative ends of the resilient means is adapted to be indexed to abutment means, forming another portion of the locking means, carried by the housing when the shifting mechanism is in a first of its selective positions. With the shiftable member in said first position, upon initial movement of the actuating lever in a first direction from its first position, the first operative end is displaced from its indexed relationship with the abutting means while the actuating lever moves in a lost motion relationship with the shifting element and, upon further movement of the actuating lever in said first direction, the same engages the shifting element to cause the latter to move the shiftable member to its other alternate position. Upon the shiftable member reaching its other alternate position, the other operative end of the resilient means engages the abutting means to lock the shiftable member in such other alternate position.

Referring now to the drawings, a power take-off unit, shown generally at 10, includes a housing 12 formed with a mounting flange 14 surrounding the lower face 16 thereof. The flange 14 is adapted to be secured to a case, shown fragmentarily at 18, of a source of rotative power in the form of a main transmission, by means of a plurality of bolts 20 disposed within aligned openings 22 and 24 in the housing 12 and in the case 18 respectively. The housing 12 is provided with a central opening 26 which registers with an opening 28 in the case 18.

Figure 2:
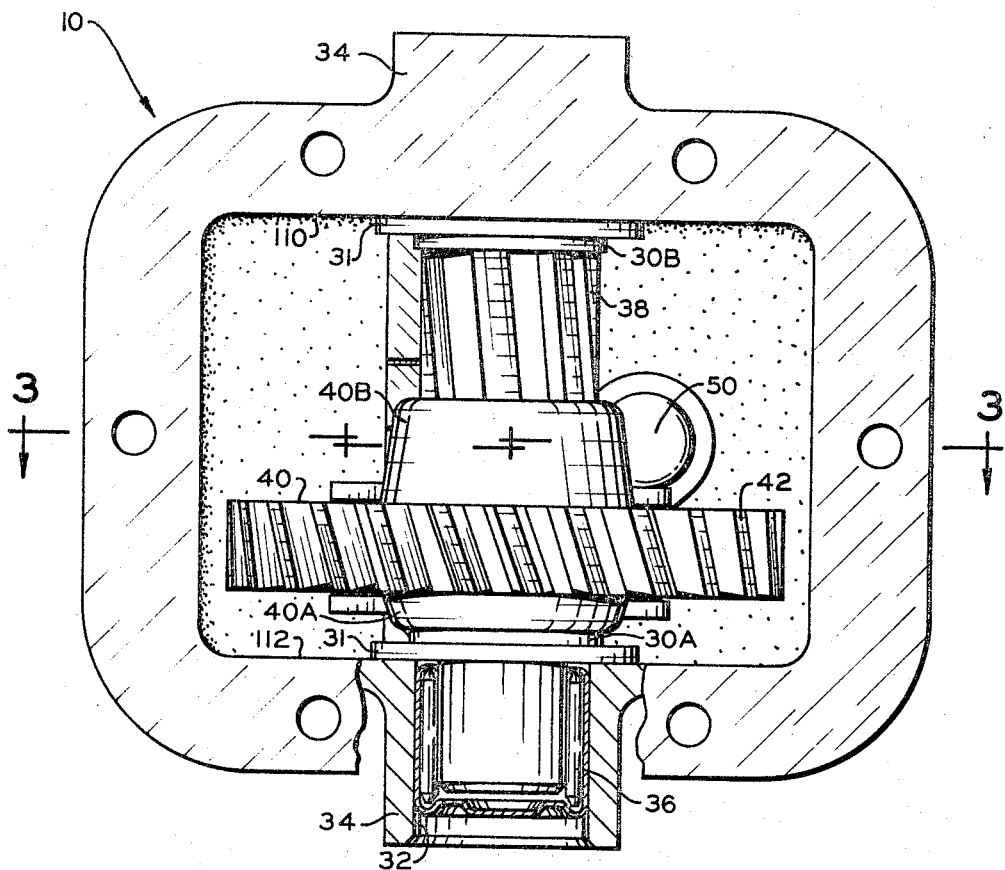
FIG. 2 is a view of the unit shown in FIG. 1 looking into the open bottom in the housing thereof and with portions of the housing broken away for added clarity.
Figure 3:
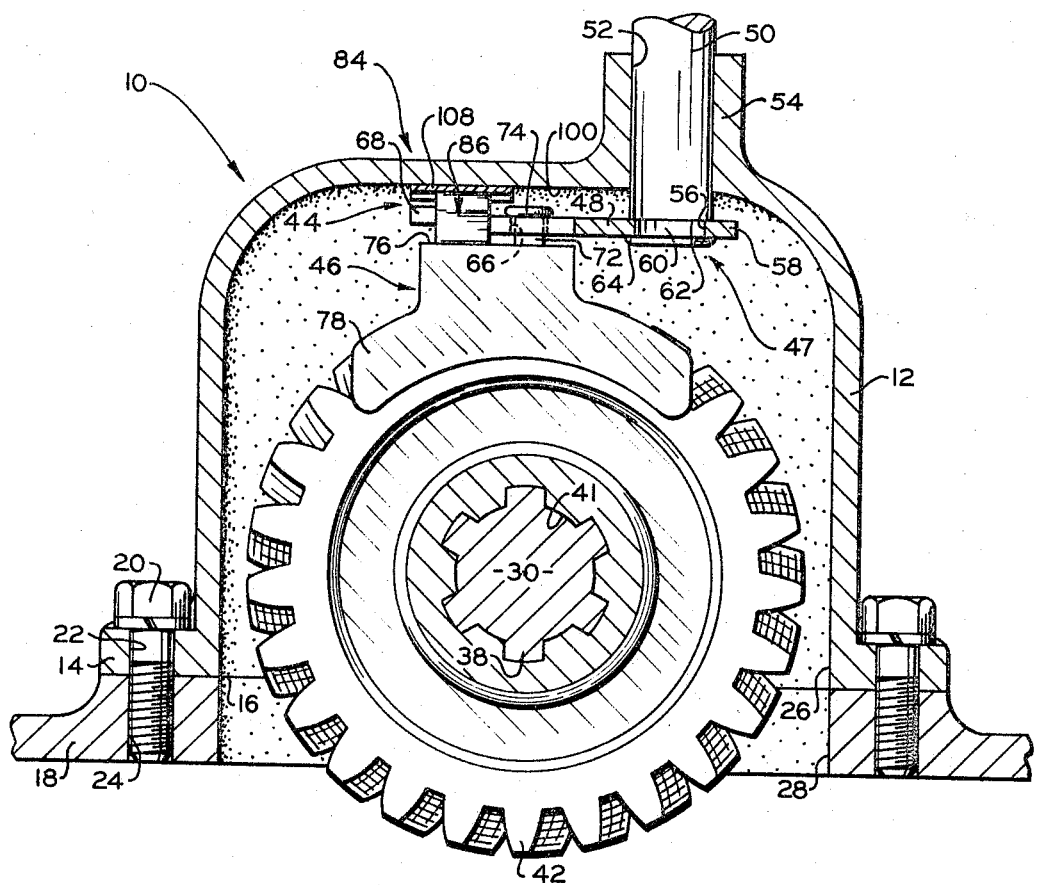
FIG. 3 is a cross-sectional view of a power take-off unit shown taken along the line 3—3 in FIG. 2 and showing a portion of the casing of the main transmission to which the power take-off unit is secured.

A first or output shaft 30 is rotatably received within a pair of aligned openings 32 formed within spaced, aligned bosses 34, only one such opening being shown in FIG. 2. A needle bearing assembly 36 is disposed between the ends of the shaft 30 and the openings 32 to facilitate rotation of the shaft. The shaft 30 is provided with axially extending peripheral helical splines 38, and a shiftable gear 40 having a helically splined bore 41, is splined to the shaft 30 and adapted for unitary rotation therewith while being axially movable therealong. The gear 40 is provided with peripheral gear teeth 42 which are operative to engage peripheral gear teeth of a driving gear, shown fragmentarily at 43, within the main transmission 18. The gear 40 has a pair of opposed hubs 40A and 40B respectively abuttingly engageable with axially spaced thrust washers 30A and 30B in the form of snap rings carried in cooperating grooves 30C by the shaft 30 on the portion thereof spaced slightly from the housing 12. A second thrust washer 31 is rotatably disposed on the shaft 30 intermediate each washer 30A and 30B and the housing 12 to axially position the shaft 30.

Disposed within the housing 12 is a shifting mechanism, shown generally at 44, comprising a shifting element 46 and an actuating means 47; the latter including an elongated actuating lever 48 and an actuating shaft 50, which shaft is rotatably disposed in an opening 52 formed in a boss 54 integral with the housing 12. The actuating lever 48 is provided with an opening 56 adjacent its inner end 58, which opening receives a reduced portion 60 of the shaft 50 so that lever 48 engages a shoulder 62 of the shaft 50. The lever 48 is securely attached to the actuating shaft 50 for unitary rotation therewith by peening over of the outer end of the shaft 56 as shown at 64. The lever 48 has an arcuately elongated slot 66 therein, as best seen in FIGS. 4, 6, 8, 10 and 12, formed about a center lying on the axis of the shaft 50, which slot is positioned intermediate the edges of the lever and is disposed between the opening 56 and the outer end 68 of the lever. In addition, the outer end 68 of the lever 48 is angularly relieved as shown at 70 to allow a greater degree of rotation before contact is made with the housing 12, as clearly seen in FIG. 4 and for another purpose hereinafter described.

The shifting element 46 is generally channel shaped and comprises a base portion 76 from which a pair of parallel and axially spaced arms 78 and 80 depend. These arms 78 and 80 are rigid and rotatably receive the peripheral portion of the gear 40 therebetween and are operative to carry the gear therewith axially with respect to the shaft 30. The base portion 76 is spaced from the periphery of the gear 40 so that the element 46, while moving the gear axially, can move transversely with respect to the gear.

A rivet 72 is fixedly secured to the base portion 76 of the shifting element 46, extends into and through the slot 66 and has an enlarged head 74 whose diameter is larger than the width of the slot, thereby preventing removal of the rivet from the slot while allowing free rotation of the rivet within the slot. The slot 66, on the other hand, has an arcuate length substantially greater than the diameter of the rivet 72, so that the rivet 72 and slot 66 provide a lost motion means resulting in a lost motion connection between the actuating lever 48 and the shifting element 46. The base portion 76 also has an opening 82 formed therein and positioned intermediate the end 83 thereof and the rivet 72.

Locking and indexing means shown generally at 84 is provided to lock the shifting element 46 in selected positions, thereby also locking the gear 40 in its associated selected positions. More particularly, two selected axial positions, with respect to the shaft 30, are provided for the gear 40, a first or disengaged position being when the gear is spaced at a convenient axial distance from the driving gear, which disengaged position will be considered as corresponding to the position of the shifting mechanism 44 as seen in FIGS. 4, 5, 6 and 7, and a second or engaged position being that assumed by the gear when it engages the driving gear, which engaged position will be considered as corresponding to the position of the shifting mechanism 44 as seen in FIGS. 10, 11, 12 and 13. Accordingly, for each axial position of the shifting element 46, the locking means 84 has two positions, locked and unlocked. Thus, the locking means 84 has a total of four selected positions.

The locking and indexing means 84 comprises a leaf spring 86 having a base portion 88 with a circular opening 90 in the center thereof, which opening is in registration with the opening 82 of the shifting element 46. The base portion 88 of the spring 86 is fixedly secured to the shifting element 46 by a rivet 102 which extends through the aligned openings 90 and 82 and has its ends peened over as seen at 104 and 106. Axially extending from the base portion 88 are a pair of resilient arms 92 and 94 having operative ends 96 and 98, respectively. The ends 96 and 98 are urged toward the inner wall 100 of the housing 12 by the intrinsic resiliency of the arms 92 and 94 and the base portion 88 as they react against the shifting element 46.

The outer portion of the lever 48 is disposed intermediate the leaf spring 86 and an elongated plate 108 fixedly secured to the housing 12; the plate 108 may be formed integrally with the housing if desired and extends laterally from one inner wall 110 to the opposite wall 112 of the housing 12 while being suitably fixedly secured to the wall 100. The plate 108 has a pair of laterally spaced grooves 114 and 116; the groove 114 having laterally spaced shoulders 118 and 120 and the groove 116 having laterally spaced shoulders 122 and 124, which shoulders provide abutting means for the operative ends 96 and 98 of the leaf spring 86 and form a portion of the locking means 84. As shown in FIGS. 4 to 11, the leaf spring 86 and the shoulders 118 and 120 of the groove 114 are arranged so that the operative ends 96 and 98 of the leaf spring may, depending upon the axial position of the shifting element 46, engage the shoulders 118 and 120 respectively, so that the shifting element 46 and the shiftable gear 40 are prevented from moving in the direction of the engaged operative end. Since the leaf spring 86 extends substantially axially, while being relatively easily deflected transversely away from the plate 108, it inhibits movement of the shifting element 46 in the direction of the particular one of the shoulders 118 or 120 engaged by the end 96 and 98 respectively, since any force tending to move the element 46 axially must axially deflect the spring, which axial deflection requires a substantially greater force than the force for transversely deflecting the spring. In fact the construction is such that the force for such axial deflection is greater than can be expected from the various sources of axial loads, other than shifting loads which can be expected, so that as far as axial deflection is concerned, the arms 92 and 94 can be considered rigid.

Operation

When the gear shift mechanism is in its first, or disengaged position, physical stop means are provided to inhibit movement to the left of the gear 40; such stop means conveniently taking the form of the hub 40A of the gear 40 thrustingly abutting the thrust washer 30A so that, as viewed in FIGS. 4 and 5, movement to the left of the gear 40 and the shifting element 46 is inhibited. Movement to the right is inhibited by the engagement of the end 98 of the spring 86 with the right shoulder 120 of the groove 114, the end 98 being maintained in the groove 114 by the resilient action of the resilient arm 94. In this first position, the lever 48 is intermediate the end 96 of the spring 86 and the plate 108 on the housing 12 and biases the resilient arm 92 away from the wall 100; the releaved portion 70 of the lever 48 being disposed adjacent the wall 112 of the housing 12. To shift the shiftable gear 40 to the right so that the peripheral teeth thereon meshingly engage the peripheral teeth of the driving gear 43, the actuating lever 48; as viewed in FIG. 4, is rotated counterclockwise about the axis of the shaft 50 by simultaneous counterclockwise rotation of the latter; a suitable operating means, either power or manual (not shown) is conventionally supplied to rotate the shaft 50. During initial movement of the lever 48, the same moves relative to shifting element 46 as a result of the lost motion connection, comprised of the slot 66 and rivet 72, therebetween. The actuating lever 48 moves away from the end 96 of the spring 86 and moves to a position, seen in FIGS. 6 and 7, intermediate the resilient arm 94 and the plate 108 and engages the arm 94, thereby biasing the end 98 of the spring out of the groove 114 to unlock the shifting mechanism 44. In this position, while the lever 48 is still engaging the arm 92 and biasing the end 96 away from the plate 108, such is not necessary, and if the cooperating parts were dimensioned so that the arm end 96 did engage the plate 108 at this time, such would not interfere with the operation since there is nothing at this location for the end 96 to lockingly engage.

The slot 66 is positioned so that when the actuating lever 48 is in its first position as shown in FIG. 4, the right end 66A of the slot is in engagement with the right side of the rivet 72. The arcuate length of the elongated slot 66 is such that, when the actuating lever 48 has moved to its intermediate disengaged position, as shown in FIG. 6, and has engaged the arm 94 of the spring 86, the left end 66B of the slot 66 moves into engagement with the rivet 72. Accordingly, during this unlocking of the spring end 98, the lever 48 moves in a lost motion relationship with the rivet 72 and the shifting element 46, for no shifting movement of the shifting element 46 occurs when the lever 48 moves to disengage the operative end 98 of the spring 86 from the shoulder 120 of the groove 114 until engagement is made between the left side 66B of the slot 66 and the rivet 72, thus the slot 66 and rivet 72 function as a lost motion connection during such movement.

After the shifting mechanism 44 is unlocked, as shown in FIGS. 6 and 7 and as the actuating lever 48 is rotated further counterclockwise, as shown in FIGS. 8 to 11, since the left side 66B of the elongated slot 66 is engaged with the rivet 72, the actuating lever carries the rivet 72 arcuately therewith. The shifting element 46, while moving arcuately with the rivet 72, also rotates with the rivet relative to the lever 48 since the arms 78 and 80 engage the axial sides of the gear 40. This relative rotation between element 46 and lever 48 results in the lever moving arcuately relative to the arms 92 and 94, the latter being secured to the shifting element, so that the lever assumes the position, shown clearly in FIG. 9 wherein it is free from engagement with the arm 92 and the end 96 moves into pressing engagement with the plate 108. The portion 70 of the actuating lever 48 is relieved sufficiently so that upon the lever reaching the position shown in FIG. 9 the lever is spaced from the arm 92. When the position of FIG. 10 is reached, the lever 48 engages the end 98. The shifting element 46, while thus moving arcuately, shifts the gear 40 axially to the right wherein the teeth 42 thereon engage the teeth of the gear 43. During this movement the shifting element, while moving the gear 40 axially, moves transversely relative to the gear 40, such movement being accommodated by the arms 78 and 80.

Physical stop means is provided to limit movement to the right of the gear 40 when full engagement is attained and takes the form of the hub 40B of the gear 40 axially engaging the thrust washer 30B; it being understood that other forms of physical stops can be provided to engage the gear 40 or various portions of the shifting mechanism to inhibit such further movement. When the gear 40 is in its fully engaged position, the shifting mechanism 47 and locking means 48 assume the position shown in FIGS. 10 and 11 which represents the locked, fully engaged position. In this position, the end 96 of the spring 86 has moved into the groove 114 and is in engagement with the left shoulder 118 of the groove 114, thereby preventing the shifting element 46 from returning to the left and locking the shifting mechanism and the gear 40 in their engaged positions. Since in this position the hub 40B is engaging the washer 30B, the shiftable gear 40 and the shifting element 48 are inhibited from moving further to the right.

Referring now to FIGS. 10–13, to return the shifting element 46 to its first disengaged position, the actuating lever 48 is rotated clockwise about the axis of the shaft 50 by rotating the latter. During the first increment of movement, the lever 48 engages the resilient arm 92 and deflects the same outwardly relative to the plate 108 thereby moving the end 96 of the spring 86 out of the groove 114 to disengage the end 96 from the shoulder 118, as seen in FIGS. 12 and 13, while the right side of the lever barely engages the arm 94. During this initial movement, the actuating lever 48 moves in a lost motion relationship relative to shifting element 46 as the rivet 72 moves from the left side 66B to the right side 66A of the slot 66 and the lever 48 assumes an intermediate engaged position, as seen in FIGS. 12 and 13. Upon further clockwise movement, the right side 66A of the slot 66, by its engagement with the rivet 72, enables the actuating lever 48 to carry the shifting element 46 to the left toward its first position, as seen in FIGS. 4 and 5, the shifting element carrying the shiftable gear 40 to the first or disengaged position. During this further clockwise movement, the element 46, while moving axially, rotates relative to the lever 48 so that the lever moves completely free from engagement with the arm 94 and the latter biases the end 98 into engagement with the shoulder 120.

Figure 1:
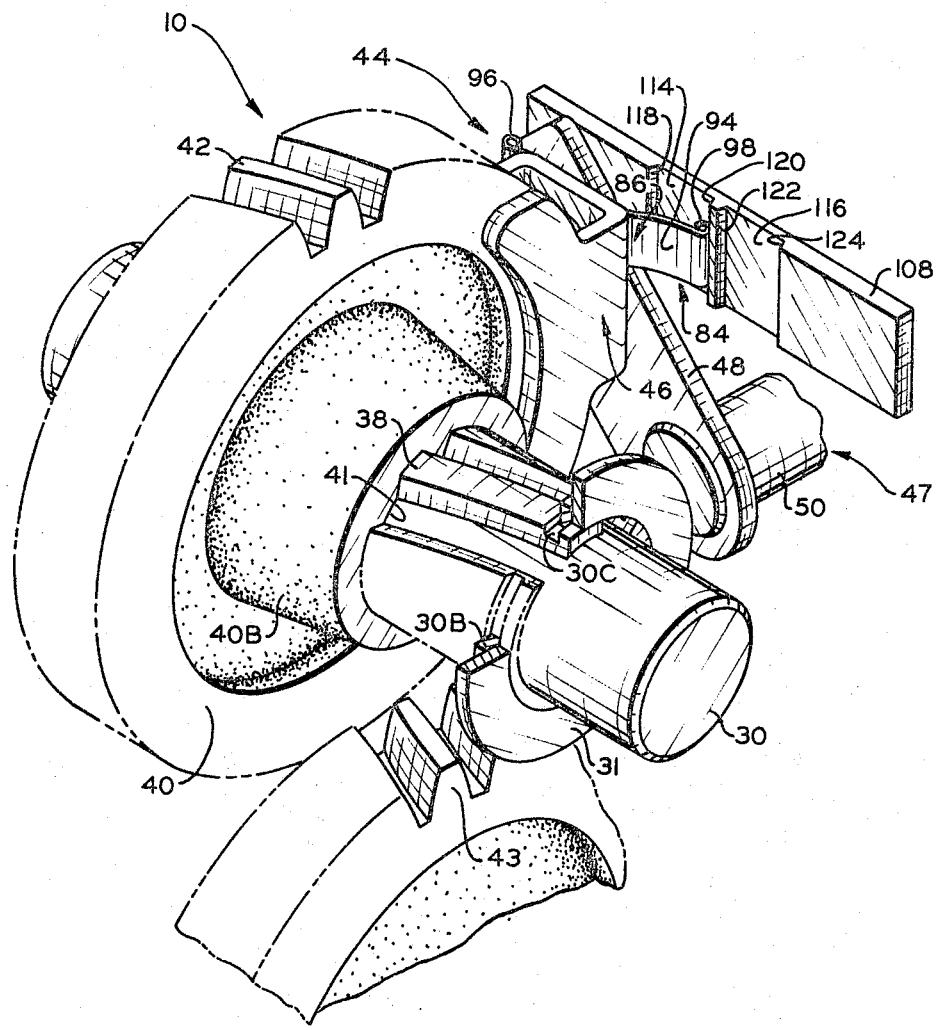
FIG. 1 is an isometric view of a transmission in the form of a power take-off unit embodying the present invention, certain portions of the unit being omitted for purposes of clarity and a driving gear of a main transmission shown fragmentarily.

It should be noted that in the above described shifting action, the groove 116 with its shoulders 122 and 124 has not been utilized. This groove 116, has been shown to indicate how simple it would be to alter the shifting pattern of this power take-off unit. As described, the shiftable gear 40 was shiftable from an extreme position to the left, as seen in FIG. 1, wherein the hub 40A engaged the thrust washer 30A, to a position wherein the hub 40B engaged the thrust washer 30B. If, on the other hand, it is desirable, or necessary, to shift the gear 40 from a disengaged position on the extreme right to an engaged position on the left, the same may be accomplished by reversing the position of the gear 40 on the shaft 30 so that the hubs 40A and 40B are adapted to engage the thrust washers 30B and 30A respectively and reversing the position of the actuating lever 48 so that its relieved portion 70 is facing the wall 110 of the housing 12. This reversing of the gear 40 and of the shifting mechanism will position the locking means 84 in a cooperative relationship with the groove 116.

In the previously described embodiment of the invention, the hubs 40A and 40B spaced on each axial side of the gear 40, were relied upon to serve a physical stop means in that one or the other, depending upon the position of the gear, would engage thrust washers 30A or 30B to prevent movement of the gear in the direction of the engaged thrust washer. In another embodiment of the invention shown in FIGS. 14 and 15, the locking means 84 alone may lock the shiftable gear 40 in both axial directions. In this embodiment four laterally extending, axially spaced grooves 126, 128, 130 and 132 are formed within the plate 108; the axial width of each groove is such as to receive the spring end 96 or 98 firmly therein with only a small clearance between the spring end and the sides of the groove. The shifting element 46 is shown in the second locked position in FIGS. 14 and 15, with the spring end 96 disposed within the groove 126 so that the shifting element is prevented from moving axially in both directions by the abutting engagement of the spring end with both of the sides of the grooves. In this position the actuating lever 48 is intermediate the other spring end 98 and the plate 108.

In order to shift the shifting element 46, the lever 48 is rotated in a clockwise direction, in a lost motion relationship relative to the shifting element, and engages the spring arm 92 to bias the end 96 out from the groove 126. As the lever 48 continues to move in the clockwise direction, the side 66A engages the rivet 72 to carry the shifting element 46 therealong and the lever 48 ceases to engage the arm 94 so that the spring end 98 engages plate 108 and slides therealong until the shifting element 46 is in its first locked position, at which time the spring end 98 enters the groove 128 to lock the shifting element. After the spring end 98 is disposed within the groove 128, the shifting element 46 will be maintained in its first locked position because of the engagement of spring end 98 with the sides of the grooves 128. Shifting from the first locked position to the second locked position is accomplished in a manner so similar to that shown and described with respect to the first embodiment in FIGS. 4–10, that it is deemed unnecessary to repeat the occurrence in such a shifting operation for this embodiment.

The other two grooves 130 and 132 are included to show how the shifting pattern of the power take-off unit may be altered in a like manner as provided by the presence of groove 116 in the previous embodiment.

From the foregoing, it is readily apparent that a device of relatively simple construction has been described which performs the shifting operation of a shiftable member wherein the shiftable member may be locked in alternate selected positions and which fully fulfills the other objects previously set forth.

While only a few embodiments of this invention have been shown and described, it is readily apparent that many changes can be made therein without departing from the scope of this invention as defined by the following claims.

What is claimed is:

1. A shifting mechanism for shifting a shiftable member between first and second opposed positions comprising in combination:
    (a) a shifting means having first and second positions corresponding to the first and second positions of the shiftable member and being engageable therewith for moving the member between its first and second positions,
    (b) stationary means disposed in a stationary position relative to said shifting means,
    (c) locking means for locking said shifting means to said stationary means when said shifting means is in its first position and including an abutting means and resilient detent means,
    (d) said abutting means being carried by said stationary means in a stationary relationship relative to said shifting means and positioned to engage said detent means when said shifting means is in its first position for inhibiting the latter from moving to its second position,
    (e) actuating means, including means movingly mounting the same to said stationary means, for moving said shifting means between its positions and for disengaging said detent means from said abutting means,
    (f) said actuating means having a first and an opposed position corresponding to said first and second positions of said shifting means and including lost motion means
        (1) for allowing said actuating means to move relative to said shifting means when moving from its first position to an intermediate position intermediate its first and opposed position, and
        (2) for connecting said actuating means to said shifting means so that as said actuating means moves from its intermediate position to its opposed position it moves said shifting means to its second position so that as said actuating means moves from its opposed position to its first position it moves said shifting means to its first position,
    (g) said resilient detent means comprising a spring secured to said shifting means and having an end engageable with said abutting means for resiliently locking said shifting means from moving from its first position toward its second position,
    (h) said actuating means engaging said spring and deflecting the same so that its end becomes disengaged from said abutting means upon movement of said actuating means from its first to its intermediate position.

2. A shifting mechanism for axially shifting a shiftable member between first and second axially opposed positions comprising in combination:
    (a) a shifting means having substantially axially opposed first and second positions corresponding to the first and second positions of the shiftable member and being engageable therewith for moving the member between its first and second positions,
    (b) stationary means disposed in an axially stationary position relative to said shifting means,
    (c) locking means for locking said shifting means to said stationary means when said shifting means is in its first position and including an abutting means and detent means,
    (d) said detent means including means securing a first portion of the same for unitary axial movement to said shifting means with a second portion of said detent means extending axially from said shifting means,
    (e) said abutting means being carried by said stationary means in a stationary relationship relative to said shifting means and being axially spaced from said securing means and adapted to axially engage said second portion of said detent means when said shifting means is in its first position for inhibiting said shifting means from moving axially to its second position,
    (f) said second portion of said detent means being resiliently transversely deflectable for moving the same into a disengaged relationship with said abutting means and being substantially axially rigid when in engagement with said abutting means and subjected to axial loads,
    (g) actuating means movingly connected to said stationary means for moving said shifting means between its positions and for transversely deflecting the second portion of said detent means and disengaging the same from said abutting means,
    (h) said actuating means having a first and an opposed position corresponding to said first and second positions of said shifting means and including lost motion means
        (1) for allowing said actuating means to move relative to said shifting means when moving from its first position to an intermediate position intermediate its first and opposed positions, and (2) for connecting said actuating means to said shifting means so that as said actuating means moves from its intermediate position to its opposed position it moves said shifting means to its second position and as said actuating means moves from its opposed position to its first position it moves said shifting means to its first position, (i) said actuating means being free from engagement with the second portion of said detent means when in its first position and engaging said second portion and transversely deflecting the same into a disengaged relationship with said abutting means upon movement of said actuating means from its first to its intermediate position.

3. A shifting mechanism for axially shifting a shiftable member between first and second axially opposed positions comprising in combination:

(a) a shifting means having substantially axially opposed first and second positions corresponding to the first and second positions of the shiftable member and being engageable therewith for moving the member between its first and second positions, (b) stationary means disposed in an axially stationary position relative to said shifting means and transversely spaced therefrom, (c) locking means for locking said shifting means to said stationary means when said shifting means is in its first position and including an abutting means and detent means, (d) said detent means including means securing a first portion of the same for unitary axial movement to said shifting means with a second portion of said detent means extending axially from said shifting means and having an engaging portion thereon spaced axially from said first portion, (e) said abutting means being carried by said stationary means in a stationary and transversely spaced relationship relative to said shifting means and, when said shifting means is in its first position, said abutting means is axially spaced from said securing means and adapted to axially engage said engaging portion of said detent means for inhibiting said shifting means from moving axially to its second position, (f) said second portion of said detent means being resiliently transversely deflectable for moving the same into a disengaged and transversely spaced relationship with said abutting means and being substantially axially rigid when in engagement with said abutting means and subjected to axial loads thereby, (g) actuating means movingly connected to said stationary means for moving said shifting means between its positions and including a portion thereof movable to a position transversely intermediate said stationary means and said second portion of said detent means for transversely deflecting the latter and disengaging said engaging portion from said abutting means, (h) said actuating means having a first and an opposed position corresponding to said first and second positions of said shifting means and including lost motion means (1) for allowing said actuating means, when said shifting means is in its first position, to move relative to said shifting means when moving from its first position to an intermediate position intermediate its first and opposed positions, and (2) for connecting said actuating means to said shifting means when said actuating means reaches its intermediate position so that as said actuating means moves from its intermediate position to its opposed position it moves said shifting means to its second position and as said actuating means moves from its opposed position to its first position it moves said shifting means to its first position, (i) said actuating means being free from engagement with the second portion of said detent means when in its first position and, upon movement of said actuating means from its first to its intermediate position the same moves transversely intermediate said second portion and said stationary means and transversely deflects said second portion and moves said engaging portion of said detent means transversely away from said abutting means.

4. A shifting mechanism according to claim 3 wherein said detent means is an axially elongated leaf spring having opposed ends, a midportion comprising said first portion and an outer end comprising said engaging portion.

5. A shifting mechanism according to claim 3 wherein said engaging portion has axially opposed surfaces thereon, said abutting means axially engages both of said axially opposed surfaces and inhibits said shifting means from moving from its first position axially to its second position and from moving from its first position in a direction axially opposite said second position.

6. A shifting mechanism for axially shifting a shiftable member between first and second axially opposed positions comprising in combination:

(a) a shifting means having substantially axially opposed first and second positions corresponding to the first and second positions of the shiftable member and being engageable therewith for moving the member between its first and second position, (b) stationary means disposed in an axially stationary position relative to said shifting means, (c) locking means for locking said shifting means to said stationary means when said shifting means is in its first and in its second position for inhibiting movement of said shifting means from moving from either of its positions to the other of its positions and including an abutting means and a first and a second detent means, (d) means securing said detent means to said shifting means for unitary axial movement therewith, (e) each of said detent means having portions extending axially from said securing means with said portion of said first detent means extending axially oppositely with respect to said portion of said second detent means, (f) said abutting means being carried by said stationary means in a stationary relationship relative to said shifting means and adapted to engage the portion of said first detent means when said shifting means is in its first position for inhibiting said shifting means from moving axially to its second position and to axially engage said portion of said second detent means when said shifting means is in its second position for inhibiting said shifting means from moving axially to its first position, (g) said portion of each of said detent means being resiliently transversely deflectable for moving the same transversely away from said abutting means and being substantially axially rigid when in engagement with said abutting means and subjected to axial loads, (h) actuating means movingly connected to said stationary means for moving said shifting means between its positions and for transversely deflecting the portion of said first detent means and disengaging the same from said abutting means prior to moving said shifting means from its first to its second position and for transversely deflecting the portion of said second detent means and disengaging the same from said abutting means prior to moving said shifting means from its second to its first position, (i) said actuating means having a first and a second position corresponding to said first and second positions of said shifting means and including lost motion means (1) for allowing said actuating means, when said shifting means and said actuating means are in their first positions, to move relative to said shifting means when moving from its first position to a first intermediate position intermediate its first and second positions, (2) for connecting said actuating means to said shifting means when said actuating means reaches its intermediate position so that as said actuating means moves from its intermediate position to its second position it moves said shifting means to its second position, (3) for allowing said actuating means, when said actuating means and said shifting means are in their second position, to move relative to said shifting means when moving from its second position to a second intermediate position intermediate its second position and its first intermediate position, and (4) upon reaching its second intermediate position when moving from its second position, for connecting said actuating means to said shifting means so that as said actuating means moves from its second intermediate position to its first position it moves said shifting means to its first position, (j) said actuating means being free from engagement with the portion of said first detent means when in its first position and engaging and transversely deflecting the same into a disengaged relationship with said abutting means upon movement of said actuating means from its first position to its first intermediate position, and (k) said actuating means being free from engagement with the portion of said second detent means when in its second position and engaging and transversely deflecting the same into a disengaged relationship with said abutting means upon movement of said actuating means from its second position to its second intermediate position.

7. A shifting mechanism according to claim 6 wherein each of said detent means comprises an axially elongated leaf spring means.

8. A shifting mechanism according to claim 6 wherein said first and second detent means are formed integrally with each other and comprise an axially elongated leaf spring, and said securing means secures a portion of said leaf spring intermediate its axial ends to said shifting means so that said leaf spring moves axially unitarily with said shifting means.

References Cited
UNITED STATES PATENTS

| | | |
|---|---|---|
| 2,933,928 | 4/1960 | Wagner. |
| 3,016,759 | 1/1962 | Fletcher _____ 74—475 |
| 3,270,580 | 9/1966 | Wagner _____ 74—475 |

MILTON KAUFMAN, *Primary Examiner.*